US010922850B1

(12) United States Patent
Harrison et al.

(10) Patent No.: US 10,922,850 B1
(45) Date of Patent: Feb. 16, 2021

(54) AUGMENTED REALITY SYSTEM FOR PERSONA SIMULATION

(71) Applicants: Justin Harrison, Woodland Hills, CA (US); Daniel Whitaker, Duvall, WA (US)

(72) Inventors: Justin Harrison, Woodland Hills, CA (US); Daniel Whitaker, Duvall, WA (US)

( * ) Notice: Subject to any disclaimer, the term of this patent is extended or adjusted under 35 U.S.C. 154(b) by 0 days.

(21) Appl. No.: 16/986,212

(22) Filed: Aug. 5, 2020

(51) Int. Cl.
| | |
|---|---|
| G06F 3/048 | (2013.01) |
| G06T 11/00 | (2006.01) |
| G06F 3/16 | (2006.01) |
| G06N 3/04 | (2006.01) |
| G02B 27/01 | (2006.01) |
| G06N 3/00 | (2006.01) |
| G06F 3/01 | (2006.01) |

(52) U.S. Cl.
CPC .......... *G06T 11/00* (2013.01); *G02B 27/0172* (2013.01); *G06F 3/16* (2013.01); *G06N 3/006* (2013.01); *G06N 3/04* (2013.01); *G02B 2027/014* (2013.01); *G02B 2027/0178* (2013.01)

(58) Field of Classification Search
CPC ..................................................... G06F 3/0481
See application file for complete search history.

(56) References Cited

U.S. PATENT DOCUMENTS

| | | | |
|---|---|---|---|
| 9,696,795 B2 * | 7/2017 | Marcolina ............... | G06F 3/011 |
| 9,996,797 B1 * | 6/2018 | Holz ................... | G06F 3/04842 |
| 10,298,911 B2 * | 5/2019 | Shuster ................ | H04N 13/293 |
| 2009/0299932 A1 | 12/2009 | Hodge et al. | |
| 2012/0194418 A1 * | 8/2012 | Osterhout .......... | G02B 27/0149 |
| | | | 345/156 |
| 2012/0194549 A1 * | 8/2012 | Osterhout .......... | G02B 27/0093 |
| | | | 345/633 |
| 2015/0324692 A1 * | 11/2015 | Ritchey ................. | A61B 5/686 |
| | | | 348/14.08 |
| 2017/0185261 A1 * | 6/2017 | Perez ................. | G06F 3/04815 |
| 2019/0228330 A1 * | 7/2019 | Kaifosh ................ | G06N 7/005 |
| 2019/0384389 A1 * | 12/2019 | Kim .................... | G06K 9/00885 |
| 2020/0265526 A1 * | 8/2020 | Ogunsusi ........... | G06Q 30/0631 |

OTHER PUBLICATIONS

Pardes, Arielle, "The Emotional Chatbots are Here to Probe our Feelings," https://www.google.com/amp/s/www.wired.com/story/replika-open-source/amp, Jul. 13, 2020.

* cited by examiner

*Primary Examiner* — Nicholas Augustine
(74) *Attorney, Agent, or Firm* — Patent Ingenuity, P.C.; Samuel K. Simpson

(57) ABSTRACT

A computer-implemented augmented reality essence generation platform has a processor. An interaction and location synchronization engine synchronizes interaction data between an active user and an inactive user with location data of a geographical location at which the active user and the inactive user participated in a real-world experience during a time period in which the inactive user was active. Moreover, an essence generation engine generates, via the processor, a virtual persona model of the inactive user based upon the interaction data and the location data. Additionally, a neural network engine generates, via the processor, a neural network that simulates, during a time period in which the inactive user is inactive, a virtual persona of the inactive user based on the virtual persona model during a virtual interaction between the active user and a virtual representation of the inactive user.

20 Claims, 8 Drawing Sheets

AUGMENTED REALITY SYSTEM FOR PERSONA SIMULATION

BACKGROUND

1. Field

This disclosure generally relates to the field of computing systems. More particularly, the disclosure relates to mixed reality ("MR") systems.

2. General Background

With recent advances in computing ability, a variety of configurations have attempted to remove the need for human-to-human interactivity in favor of human-to-AI interactivity, specifically with respect to business transactions. For example, a variety of business-related software applications (e.g., banking, insurance, e-commerce, etc.) allow a user operating a computing device (e.g., desktop computer, laptop computer, smartphone, tablet device, smartwatch, etc.) to interact with a chatbot, which is generally deemed to be a software application operated by an AI. A human user may ask the chatbot various questions, which may be general in nature, account specific, product specific, service specific, etc.; subsequently, the chatbot may respond with an answer to that question. The dialogue between the human user and the chatbot typically takes the form of a text-based dialogue.

Even though the responsiveness of the chatbot may be as fast, or even faster, than that of a human agent, it often is limited in the interaction it can provide to a human user. For example, a user may have a question that is atypical of what most other users ask, and for which the chatbot does not have any answer; in such an instance, the chatbot may transition the dialogue to a human agent that can interact better with the human user.

Although some current chatbot configurations may be convincing enough to pass the Turing test (an evaluation to determine whether or not the chatbot's behavior is indistinguishable from that of a human being) in certain circumstances, as noted above, they are for the most part convincing because they simulate a stranger to that of the user. In other words, a user having a text-based dialogue with an agent about the user's account has no baseline of comparison other than how a human agent would answer account-specific questions. And even in those instances, a human agent often reads from an introductory script and provides standardized information. In other words, in a business-related dialogue, a chatbot may be able to simulate, with some degree of efficacy, the behavior of a customer service agent that is most likely a stranger to the user.

However, in more personal settings outside of the foregoing customer service contexts, current chatbots are easily identified by a human user. The reason for this is that personal interactions typically go beyond fact-based questions and answers. As much as current chatbot configurations may attempt to use colloquial phrases and verbiage, their behavior during an interaction with a human user is essentially limited to simulating interaction with a stranger.

As a result, current AI configurations are only able to simulate a generic version of a human's personality, and do so with realism that is limited to specific contexts and a minute level of functionality.

SUMMARY

In one embodiment, a computer-implemented augmented reality ("AR") essence generation platform has a processor. Furthermore, the computer-implemented AR essence generation platform has an interaction and location synchronization engine that synchronizes interaction data between an active user and an inactive user with location data of a geographical location at which the active user and the inactive user participated in a real-world experience during a time period in which the inactive user was active. The computer-implemented AR essence generation platform also has an essence generation engine that generates, via the processor, a virtual persona model of the inactive user based upon the interaction data and the location data. Additionally, the computer-implemented AR essence generation platform has a neural network engine that generates, via the processor, a neural network that simulates, during a time period in which the inactive user is inactive, a virtual persona of the inactive user based on the virtual persona model during a virtual interaction between the active user and a virtual representation of the inactive user. Finally, the computer-implemented AR essence generation platform has an AR engine that generates, via the processor, an AR experience by overlaying virtual imagery corresponding to the virtual persona of the inactive user over real-world imagery viewed through an AR computing device.

In another embodiment, a computer program product comprises a non-transitory computer useable storage device having a computer readable program. When executed on a server computer, the computer readable program causes the server computer to perform the functionality of the computer-implemented AR essence generation platform. Alternatively, when executed on an AR computing device, the computer readable program causes the AR computing device to perform the functionality on the AR computing device.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
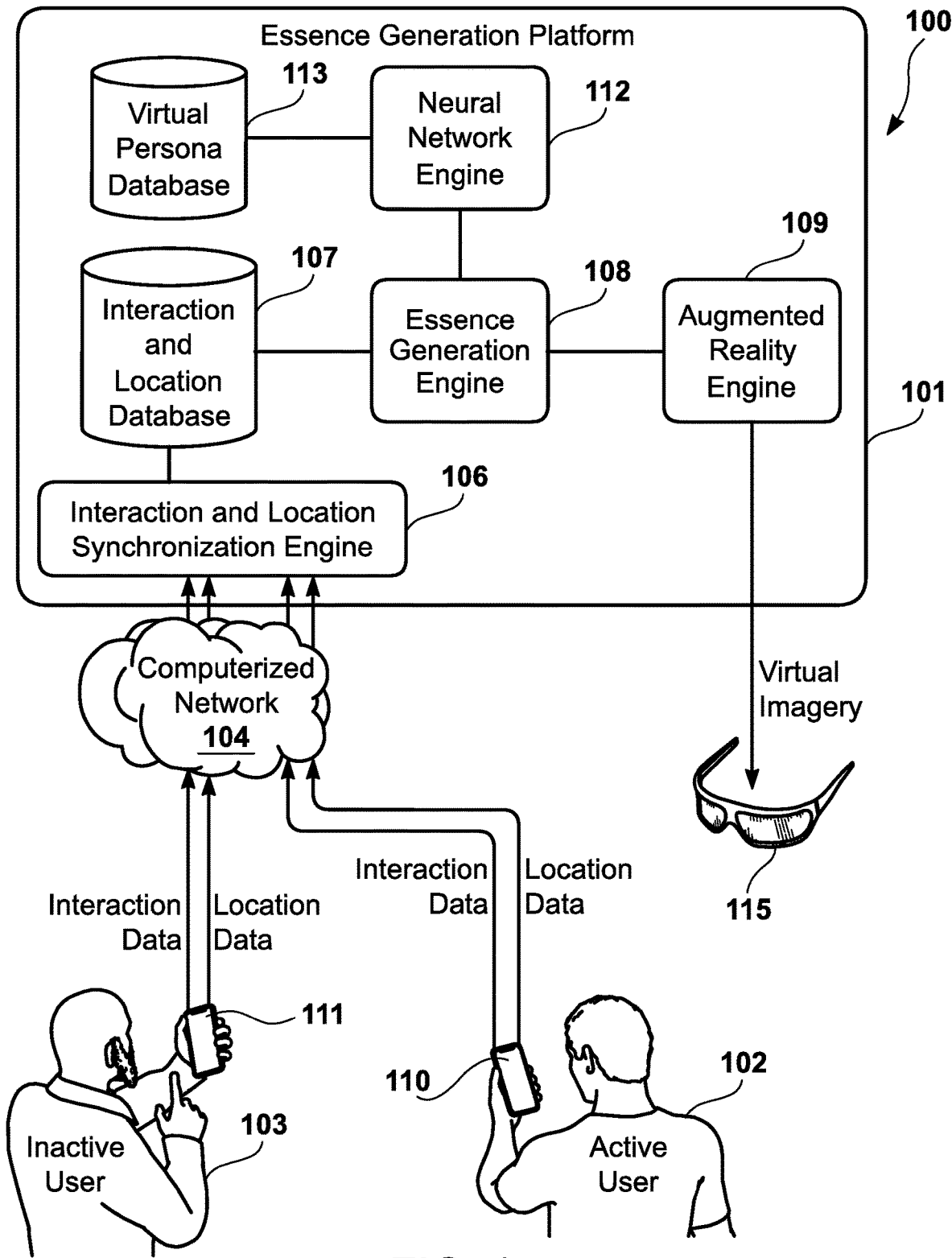
FIG. 1 illustrates an AR system that may be utilized to generate an AR experience having a virtual persona of the inactive user at a particular geographic location.

An AR system generates an AR experience that simulates a persona of a human being (e.g., a family member, friend, co-worker, etc.) who had previously interacted with a user of the AR system. After the human being becomes physically incapacitated or deceased, the user is able to interact with a virtual simulation of the affected human being in a visual and auditory manner in a similar manner to when that affected human being was alive or not physically incapacitated. Through a partial real-world experience, such as the user being present in a geographic location in which the user had previously interacted with the affected human being, and a partial virtual experience, a virtual simulation of the affected human overlaid over the real-world scenery, the AR system provides a realistic interaction of how the user and affected human being would have interacted during a real-world interaction. In other words, the AR system generates an AR experience that simulates the persona of the affected human being in the way that the affected human being would have interacted with the user, as well as how that interaction would have materialized in the particular geographic location. As a result, the AR system shapes the virtual persona of the affected human being based on who the user is and where the user is physically located during the AR experience. (Physical incapacitation is intended herein to encompass a variety of physical and mental conditions including, but not limited to, Alzheimer's disease, dementia, coma, etc., that interfere with the ability of the affected human being to interact with the user. Such conditions may be either permanent or temporary. If the condition is temporary, the inactive user may become active again.)

By way of contrast with previous chatbot configurations, the AR system goes beyond fact-based questions and answers, and customizes interactions to the particular user and the particular location of the user. The AR system recognizes that a persona is not static with respect to interactions with all individuals, but rather may be quite different with respect to interactions with different live users in different geographic locations. For example, the persona, while living or not physically incapacitated, may have spoken with a first set of mannerisms to relatives, and a second, different set of mannerisms to coworkers. Furthermore, the affected human may have spoken with one subset of the first set of mannerisms to relatives while at home, but a different subset of the first set of mannerisms when at a particular geographic location, such as a park. Rather than having a universal set of rules for interactions with all users, the AR system captures and processes the disparities amongst the interactions of the affected human and various users, thereby allowing for the adaptive generation of interactions, which are dependent upon the particular user that is interacting with the virtual persona and the location of that particular user. This adaptive interaction provides a sense of realism for the user—giving him or her a realistic sense of actual interaction with the virtual persona. And the user is able to sense the realism of such interaction because he or she would have been used to one or more parameters that were often present in previous interactions with the affected human. For example, the sense of realism stems not only from a knowledge base of facts known to the affected human associated with the virtual persona, but also from various persona mannerisms, such as response speed, memory retrieval, response length or brevity, dialogue interjection frequency, patience, tone, attitude, levity, or the like. And certain memories, topics for discussion, mannerisms, etc. may be evoked as a result of the presence of the affected human and user within the particular geographic location.

In another embodiment, an MR configuration, whether AR-based or VR-based, is interaction-based without being reliant on a geographic location. For example, an AR experience may be generated based on simulated interactions that the affected human being would have likely had with the user, without consideration being given to a particular location for the interaction. In other words, the interaction simulations may be potentially the same in different geographic locations, rather than varying based on location data.

FIG. 1 illustrates an AR system 100 that may be utilized to generate an AR experience having a virtual persona of the inactive user (i.e., physically incapacitated or deceased) at a particular geographic location. In particular, the AR system 100 may have an essence generation platform 101 (e.g., server) that generates the virtual persona of the inactive user 103 particular to interactions with a given active user 102 at a particular geographic location.

The essence generation platform 101 may have an interaction and location synchronization engine 106 that synchronizes interaction data and location data received from the active user 102, such as through a computing device 110 (e.g., smartphone, tablet device, smart glasses, smart watch, laptop computer, personal computer, kiosk, etc.), and the inactive user 103 (potentially through another computing device 111), while the inactive user 103 is active and interacting with the active user 102 at a particular geographic location, or while discussing the geographic location at a remote location from the geographic location. Accordingly, the interaction and location synchronization engine 106 may capture data in various forms (e.g., emails, images, videos, text messages, chats, etc.) from various sources, and may synchronize interaction data between the active user 102 and the inactive user 103, who may have been active at the time of synchronization prior to AR experience generation, to correspond to a particular geographic location. In one embodiment, a tagging mechanism may be utilized to tag data with various indicia corresponding to users and geographic locations. Furthermore, one or more timestamps may be utilized to synchronize user identifiers with the geographic locations.

Additionally, the essence generation platform 101 may store the interaction and location data in an interaction and location database 107. After the inactive user 103 becomes inactive, the essence generation engine 108 may then generate a virtual persona of the inactive user 103 based on interaction and location data that is retrieved from the interaction and location database 107 based upon the identity and location of the particular active user 102. For example, the essence generation platform 101 may receive data that identifies the active user 102 and location-based data (e.g., Global Positioning System ("GPS") coordinates) identifying the geographic location of the computing device 110 of that active user 102; based, at least in part, on such data, the essence generation engine 108 may generate a simulated persona of the inactive user 103. For instance, the essence generation platform 101 may utilize a neural network engine 112, which is trained based on particular users and particular geographical locations. Accordingly, the neural network engine 112 may be trained to interact with the same active user 102 differently (e.g., different mannerisms, gestures, questions, answers, etc.) at different geographic locations, and different active users 102 differently at the same or different geographic locations. A virtual persona database 113 may store the different instances of the virtual persona for subsequent retrieval based on the particular active user 102 and corresponding geographic location. In other words, in one embodiment, the essence generation platform 101 preconfigures a plurality of virtual persona for the same inactive user 103 such that each virtual persona is ready for real-time (measured as a humanly imperceptible time delay), or substantially real-time (measured as a humanly perceptible, but acceptable, time delay), retrieval depending upon the particular active user 102 requesting interaction and the particular geographical location from which the request is received from the computing device 110 of the active user 102. In another embodiment, the essence generation platform 101 determines each particular virtual persona on-the-fly.

An AR engine 109 may then generates virtual imagery for positioning as an overlay over real-world scenery at the particular geographical location of the interaction between the active user 102 and the virtual simulation of the inactive user 103. In particular, the virtual imagery may include imagery of the inactive user 103, which provides the perception of the inactive user 103 being present at the geographical location of the real-world environment in which the active user 102 is situated. For instance, the AR engine 109 may generate computer generated imagery of the inactive user 103, and that imagery may be manipulated to impart the physical mannerisms (e.g., hand gestures, head motions, facial expressions, etc.) to which the active user 102 is accustomed to observing from the inactive user 103 during interactions with the inactive user 103, while active, at the geographic location. Additionally, the AR engine 109 may generate audio emissions that correspond to the computer generated imagery. Accordingly, the AR engine 109 may effectively simulate an interaction between the active user 102 and the inactive user 103 at a particular geographic location, and may adapt that interaction to different geographic locations at which the active user 102 is located. In some instances, the geographic location at which the active user 102 is located may not exactly match a geographic location at which the active user 102 and the inactive user 103 previously had a real-world interaction; in which case, the AR engine 109 would search the interaction and location database 107 for a substantially similar geographic location (i.e., meeting a predetermined similarity threshold, such as seventy to ninety-nine percent) at which the active user 102 and the inactive user 103 had a previous interaction, and retrieve the virtual persona from the virtual persona database 113 for generation of the AR experience at the current geographic location of the active user 102. For example, the active user 102 may be located at a park at which the active user 102 and the inactive user 103 never had a real-world interaction, but the interaction and location database 107 may store interaction and location data for an interaction at a different park. The virtual persona for the other park then may be deemed substantially similar enough to be utilized to retrieve the corresponding virtual persona for use at the current real-world location of the active user 102.

Furthermore, the neural network engine 112 may be configured to adapt to the interactions with between the active user 102 and the inactive user 103, even after the inactive user 103 becomes inactive. For example, the scenery of the real-world environment in which the virtual simulation occurs may change over time (e.g., new buildings, different landscaping, etc.), thereby potentially changing the conversation that would have been had between the active user 102 and the inactive user 103 in a real-world context. Accordingly, the neural network engine 112 may analyze audio input (e.g., discussion about changes to the geographical location) received by the active user 102 that connotes the necessity of such adaptation in the interaction. Alternatively, or in addition, the essence generation platform 101 may perform image analysis on the real-world imagery, which may be captured during the AR interaction, to dynamically retrain the neural network engine 112 to interact with the active user 102 based on such changes. As another example, the essence generation engine 108 may perform a search of a database to retrieve text-based information corresponding to changes to the geographic location, and utilize such changes as a basis for conversation during the AR interaction, thereby enhancing the plausibility, for the active user 102, of the AR interaction.

Furthermore, the real-world interaction data received from the active user 102 and the inactive user 103, while being active, is not limited to in-person interactions at the particular geographic location. In fact, the neural network engine 112 may be trained based on discussions (e.g., email messages, text messages, audio conversations, video conferences, etc.) pertaining to a particular geographic location, even if the active user 102 and the inactive user 103 never met in-person at the geographic location. In other words, keywords associated with a particular geographic location may form the basis for a subsequent AR experience.

Finally, in another embodiment, the essence generation platform 101 may generate an AR experience at a geographic location based on real-world interactions between the active user 102 and the inactive user 103, while active, yet independent of location data. In other words, the essence generation platform 101 may be utilized to connote an AR experience that is customized to interactions between the active user 102 and the inactive user 103, and is not tied to any particular geographic location.

Furthermore, the essence generation platform 101 may be cloud-based, allowing interaction and location data to be captured from multiple computing devices of the active user 102 and/or the inactive user 103. Similarly, the active user 102 may use the same, or a different, computing device to participate in the AR experience that was used to provide data for the virtual persona simulation. For instance, the active user 102 may have utilized a computing device 110 that is a smartphone to capture data (e.g., automatic location data capture, user activated image capture, user activated text messages, etc.), and a different computing device 115 that is a pair of smart glasses that is utilized to render the AR experience subsequent to the inactive user 103 becoming inactive.

The computing device 115 is illustrated as a pair of smart glasses, but other types of computing devices, which are also capable of overlaying virtual imagery over a real-world environment, may be utilized instead. For example, a smartphone may be held by the active user 102 in relation to the real-world environment to overlay the virtual imagery over the real-world environment viewed by the active user 102 via the smartphone.

Although only one active user 102 and one inactive user 103 are illustrated in FIG. 1, data may be captured from additional active users 102 and inactive users 103 to allow for a plurality of active users 102 to participate in an AR experience with a plurality of virtual personas of inactive users 103. For example, an active user 102 may be used to spending time with his great grandparents in the park, and wants to participate in an AR experience that renders both virtual simulations for both of his or her grandparents in the park. As another example, two active users 102, who are siblings, may have spent time with one of their great grandparents in the park, and both want to visit the park to participate in the same AR experience (e.g., via one mobile computing device for both active users 102, or multiple computing devices for each active user 102).

In another embodiment, a different type of MR system, such as a virtual reality ("VR") system, may be utilized with similar componentry in place of the AR system 100. Instead of the AR engine 109, a VR engine may be utilized to generate a self-contained VR experience for the active user 102, who may be utilizing a computing device 115 such as an HMD to participate in a VR experience with the virtual persona. For example, the active user 102 may utilize the HMD to generate a virtual environment of the park in which he or she would go to with the inactive user 103; without the necessity of the active user 102 being physically present at the geographic location corresponding to the park.

Figure 2:
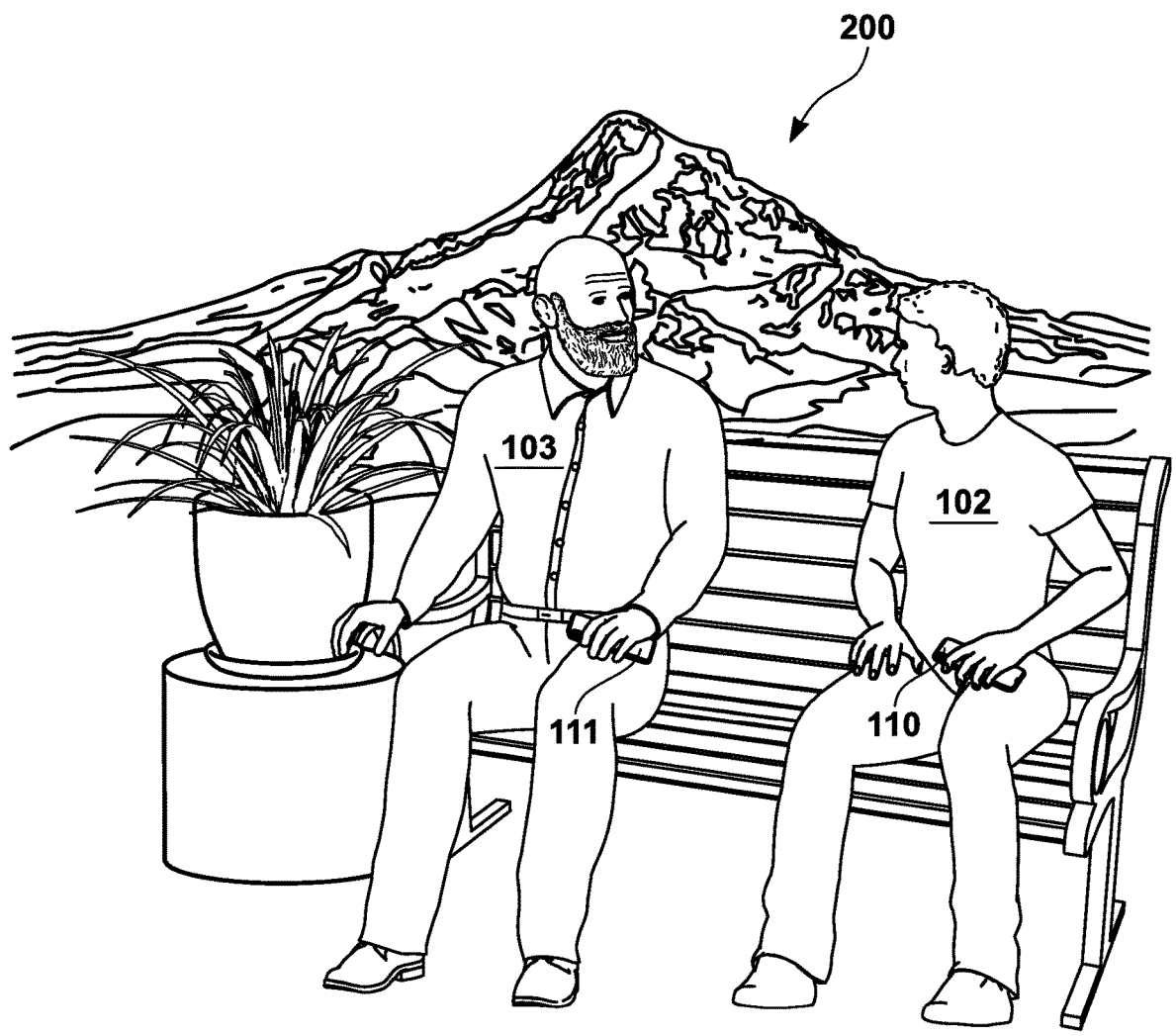
FIG. 2 illustrates an example of a physical environment that the active user and the inactive user may have visited together at some point while the inactive user was active.

FIG. 2 illustrates an example of a physical environment 200 in which the active user 102 and the inactive user 103 may have visited together at some point while the inactive user 103 was active. In particular, the computing device 110 of the active user 102 and the computing device 111 of the inactive user 103 may automatically emit location-based coordinates corresponding to the geographic location at which the active user 102 and the inactive user 103, while active, were located. As a result, the interaction and location synchronization engine 106 may synchronize the geographical presence of the active user 102 and the inactive user 103 at the geographic location. By storing geographic locations at which both the active user 102 and the inactive user 103 were present, the essence generation engine 108 may train the neural network engine 112 to simulate interactions at those geographic locations. In one embodiment, specific interactions that occurred at those geographic locations are captured (e.g., images captured, voice recordings performed, etc. at those locations). In another embodiment, independent of any particular interactions, the geographic locations themselves are stored to allow for interactions specific to the active user 102 and the inactive user 103 to be simulated by the neural network engine 112 on behalf of the inactive user 103; in this instance, the neural network engine 112 may utilize data particular to the geographic location to guide the interaction between the inactive user 103 and the active user 102. For instance, a particular landmark appearing in the scenery of the geographic location may prompt a discussion between the inactive user 103 and the active user 102. The essence generation platform 101 may determine the presence of the landmark by performing an independent image analysis or data retrieval.

Figure 3A:
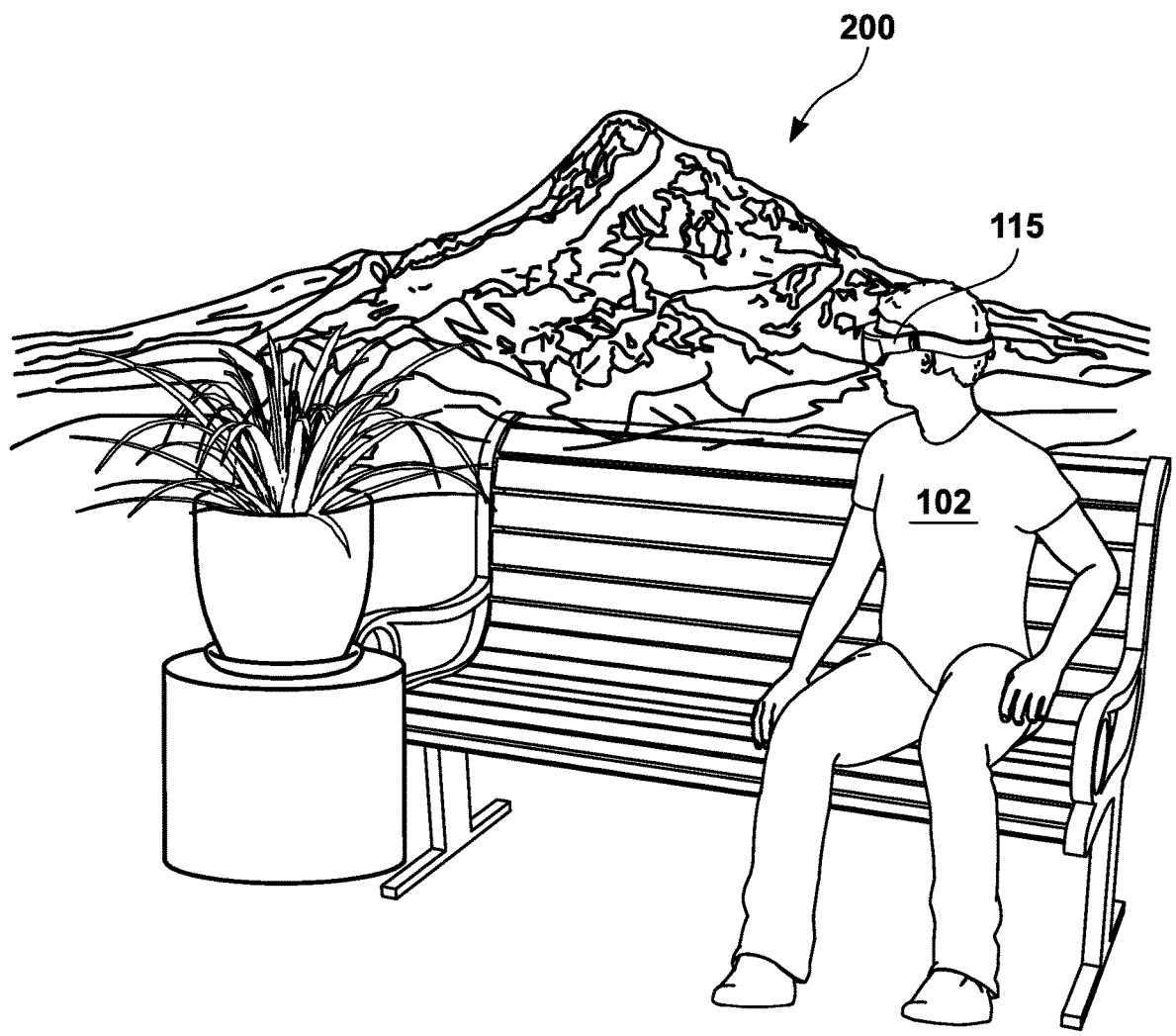
FIG. 3A illustrates the active user utilizing the computing device as smart glasses that are worn at the geographic location, without physical, real-world presence of the inactive user.
Figure 3B:
FIG. 3B illustrates a view, through the smart glasses, in which the active user is able to view the virtual simulation of the inactive user.

FIGS. 3A and 3B illustrate use of the computing device 115 as an AR device, such as smart glasses, by the active user 102 during an AR experience at the geographic location 200, illustrated in FIG. 2. In particular, the active user 102 may visit the geographic location 200 subsequent to the inactive user 103 becoming inactive. FIG. 3A illustrates the active user 102 utilizing the computing device 115 as smart glasses that are worn at the geographic location 200, without physical, real-world presence of the inactive user 103. For example, the active user 102 may visit a park that he or she went to with a great grandparent. Even though the active user 102 is physically sitting by himself, he is able to immerse himself in an AR experience that simulates the interaction he would have had with the inactive user 103. For instance, FIG. 3B illustrates a view, through the smart glasses, in which the active user 102 is able to view the virtual simulation of the inactive user 103. In one embodiment, the computing device 115 has built-in, or attachable, audio emission and reception componentry (e.g., microphone, speakers, etc.) that allow the active user 102 to listen to audio emitted by the virtual simulation of the inactive user 103, and provide an audio-based response. Accordingly, the active user 102 is able to view and listen to visual and audio, respectively, of the virtual simulation of the inactive user 103. As such, various visual-based gestures (e.g., hand gestures, facial expressions, body movements, etc.) and various audio-based expressions (e.g., tone of voice, speed, enunciation, word selection, etc.) particular to interactions with the active user 102 may be simulated by the neural network engine 112 during generation of the virtual simulation of the inactive user 103.

Figure 4A:
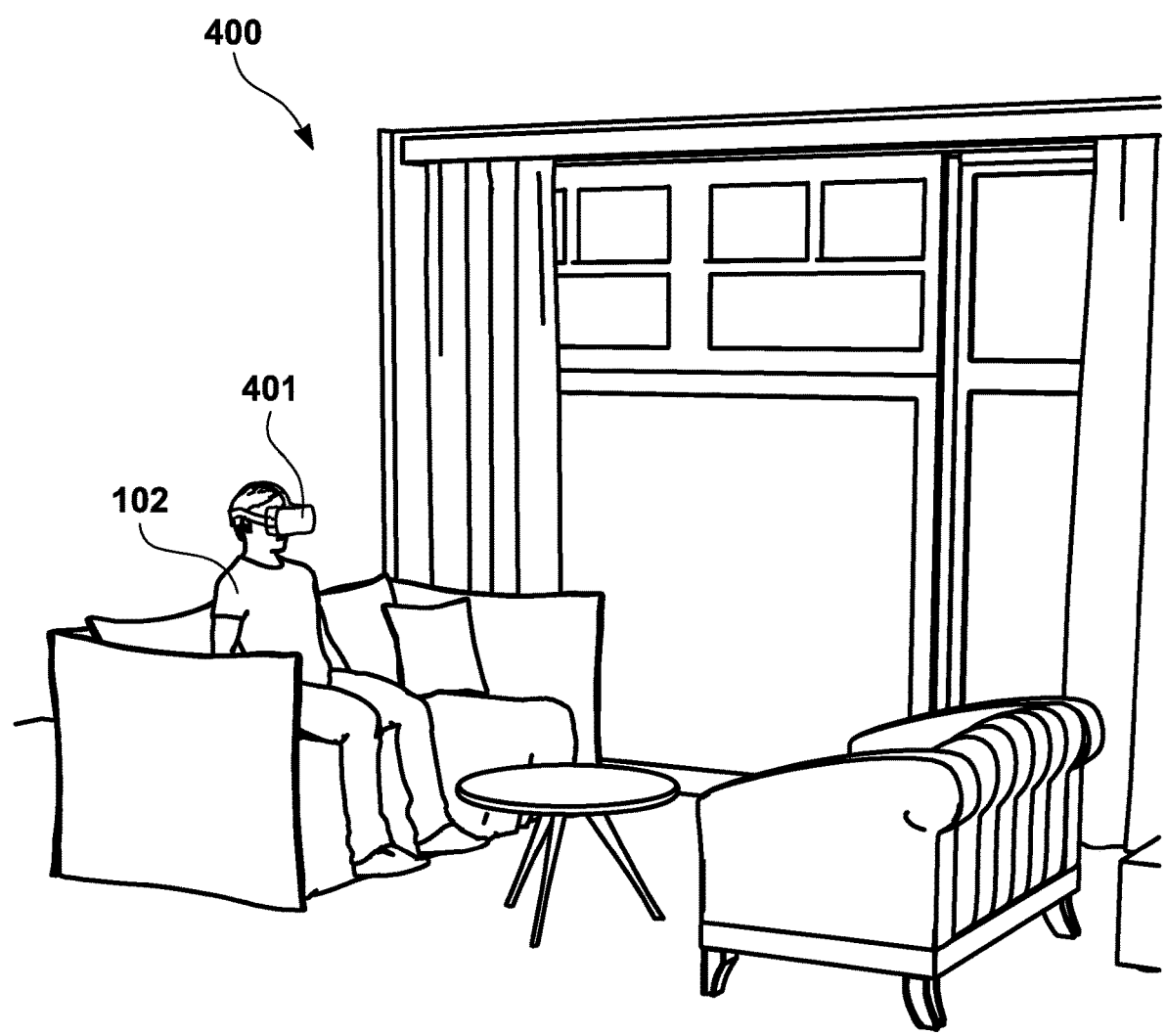
FIG. 4A illustrates the active user positioned within a real-world physical environment, such as a living room.
Figure 4B:
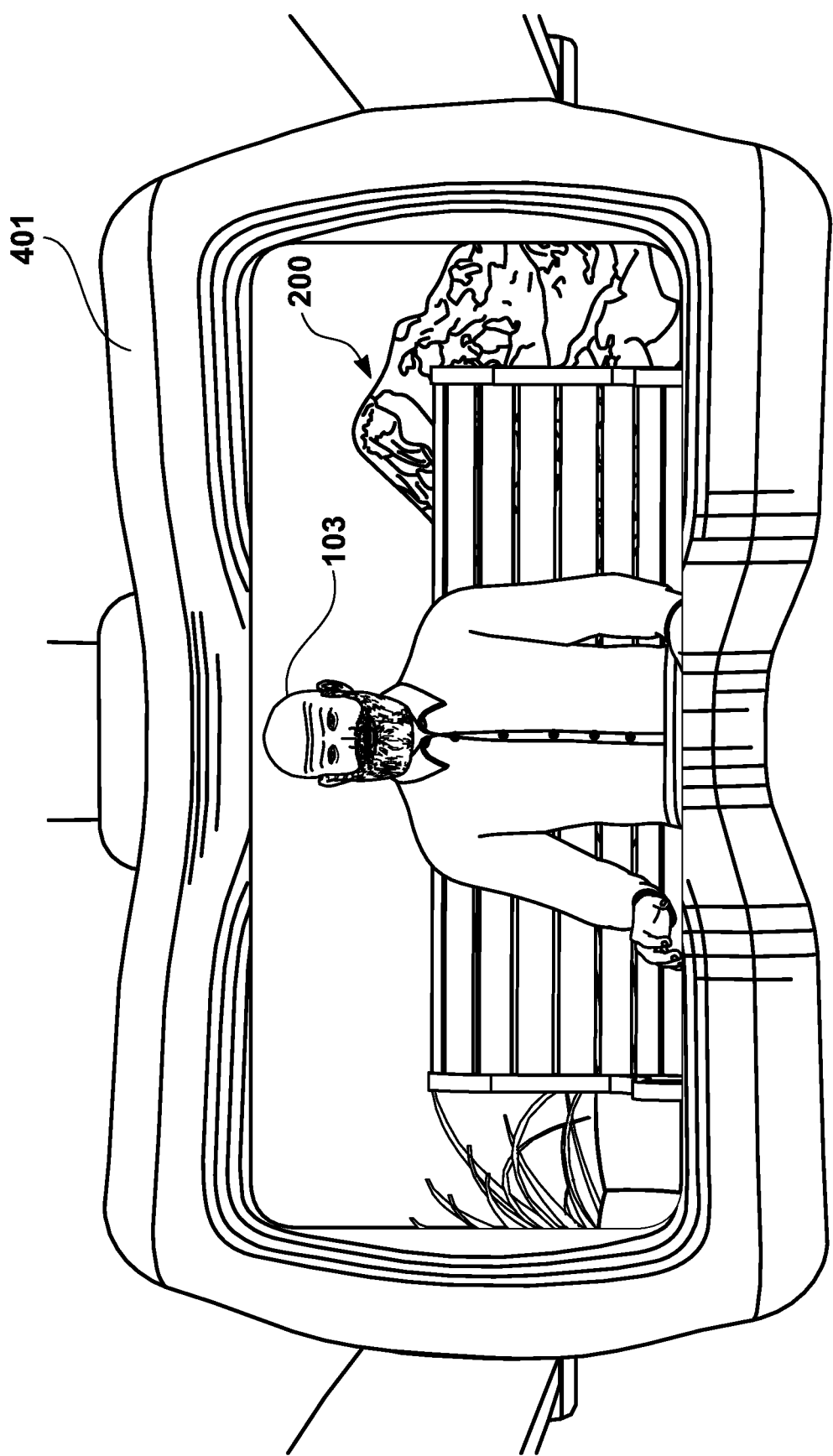
FIG. 4B illustrates a view, through a head-mounted display ("HMD"), in which the active user is able to view the virtual simulation of the inactive user at the simulated geographic location, remotely from the convenience of a living room.

FIGS. 4A and 4B illustrate use of an alternative computing device 401 as a VR device, such as an HMD, by the active user 102 during a VR experience that immerses the active user 102 in a virtual world corresponding to the geographic location 200, illustrated in FIG. 2. In particular, FIG. 4A illustrates the active user 102 positioned within a real-world physical environment 400, such as a living room. With use of the HMD, the active user 102 is able to immerse himself in a VR experience that simulates the geographic location 200 and the inactive user 103. For instance, FIG. 4B illustrates a view, through the HMD, in which the active user 102 is able to view the virtual simulation of the inactive user 103 at the simulated geographic location 200, remotely from the convenience of a living room.

Of particular note, the users and scenery provided for herein are provided only as examples. A variety of different users, scenery, geographic locations, etc. may be utilized by the computer-implemented AR essence generation platform 101, illustrated in FIG. 1. Also, the computing devices illustrated herein may be utilized for different purposes. For example, an HMD is not limited to use in a VR environment, and may be utilized in an AR environment.

Figure 5A:
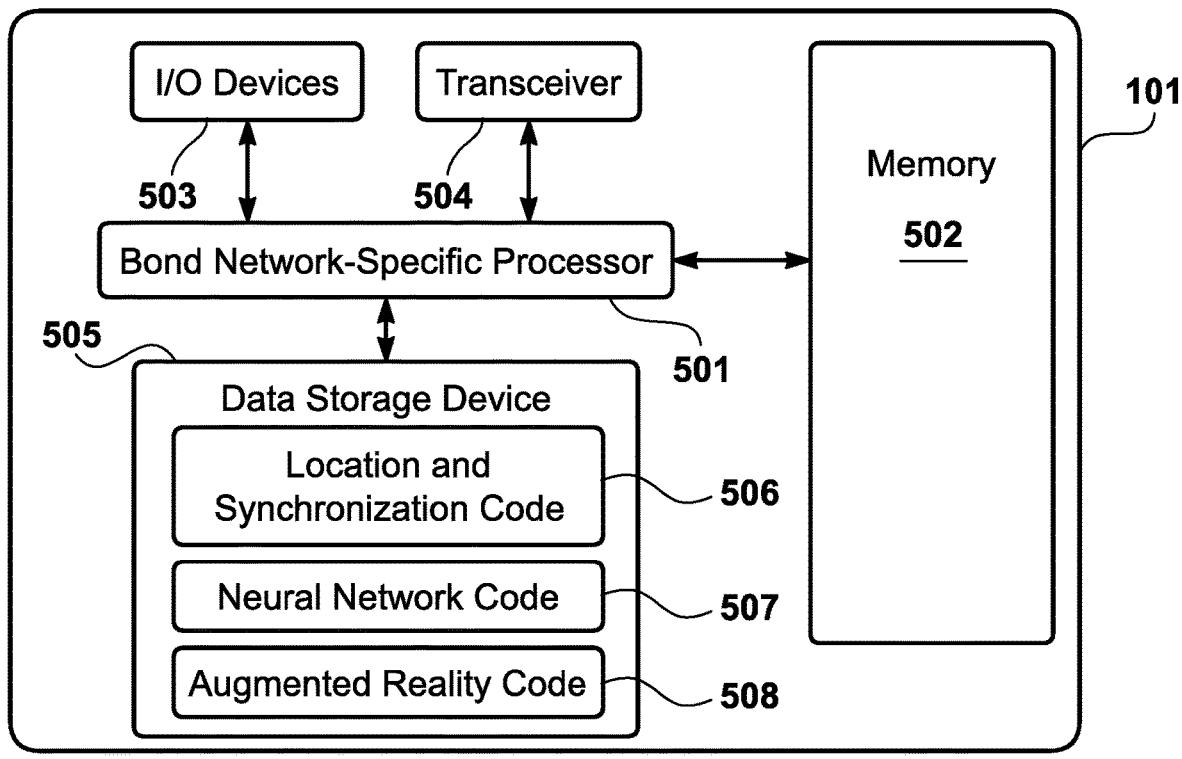
FIG. 5A illustrates a system configuration for the computer-implemented AR essence generation platform, illustrated in FIG. 1.
Figure 5B:
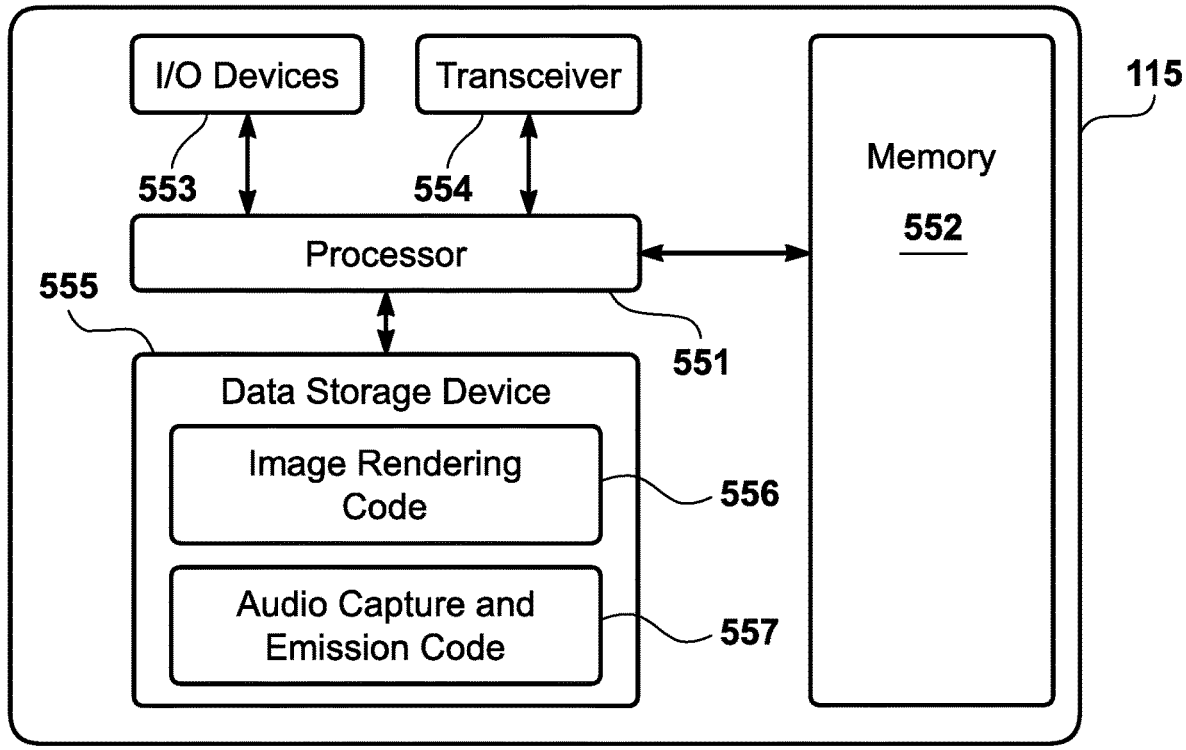
FIG. 5B illustrates a system configuration for the computing device, which may be utilized by the active user to participate in the AR experience.

FIGS. 5A and 5B illustrate system configurations for implementing the features herein. FIG. 5A illustrates a system configuration for the computer-implemented AR essence generation platform 101, illustrated in FIG. 1. The computer-implemented AR essence generation platform 101 may have a specialized processor 501, which is specifically programmed to synchronize interaction and location data, generate a virtual simulation of the inactive user 103 based on the interaction and location data, and generate an AR experience, or VR experience in the alternative. Accordingly, the processor 501 has specific capabilities for training a neural network according to a synchronized set of interaction and location data.

The system configuration may also include a memory device 502, which may temporarily store interaction data and location data. For instance, the memory device 502 may store the particular predetermined virtual persona model, which is retrieved from the virtual persona database 113, in a cache for instant access by the processor 501, thereby providing real-time, or substantially real-time, access to the virtual simulation of the inactive user 103 by the active user 102. As a result, the system configuration provides for reduced memory requirements and improved processing speed to effectuate the foregoing instantaneous access.

Furthermore, the memory device 502 may store computer readable instructions performed by the processor 501. As an example of such computer readable instructions, a data storage device 505 within the system configuration may store location and synchronization code 506, neural network code 507, and AR code 508. The processor 501 may execute the location and synchronization code 506 to synchronize the interaction and location data received from the computing devices 110 and 111, corresponding to the active user 102 and the inactive user 103, respectively. Furthermore, the processor 501 may execute the neural network code 507 to invoke the neural network engine 112 to instantiate a neural network based on the particular synchronized location and interaction data. Finally, the processor 501 may execute the AR code 109 to generate an AR experience for rendering on the computing device 115, such as smart glasses.

Additionally, the system configuration may have one or more input/output ("I/O") devices 503 that may receive inputs and provide outputs. Various devices (e.g., keyboard, microphone, mouse, pointing device, hand controller, joystick, display device, holographic projector, etc.) may be used for the I/O devices 503. The system configuration may also have a transceiver 504 to send and receive data. Alternatively, a separate transmitter and receiver may be used instead.

FIG. 5B illustrates a system configuration for the computing device 115, which may be utilized by the active user 102 to participate in the AR experience. In particular, the computing device 115 may have a processor 551, which may be specialized for rendering an AR experience at the computing device 115. The processor 551 may be specifically programmed to register the overlay of the virtual imagery corresponding to the virtual simulation of the inactive user 103 over corresponding real-world imagery. For example, the processor 551 may perform image analysis on the real-world scenery to determine the location of a park bench and coordinate placement of the overlay of the virtual representation of the inactive user 103 to be sitting at the park bench that appears to be realistic.

The system configuration may also include a memory device 552, which may temporarily store virtual imagery data received from the essence generation platform 101, illustrated in FIG. 1, as well as data of the real-world scenery captured by the computing device 115. The processor 551 may instantly retrieve such data to coordinate rendering of the virtual representation of the inactive user 103 over the real-world scenery, for immersion in an AR experience by the active user 102.

Furthermore, the memory device 552 may store computer readable instructions performed by the processor 501. As an example of such computer readable instructions, a data storage device 555 within the system configuration may store image rendering code 556 and audio capture and emission code 557. The processor 551 may execute the image rendering code 556 to render the virtual imagery of the inactive user 103 over the real-world scenery. In particular, the processor 551 may articulate visual movements (e.g., facial expressions, hand gestures, body movements, etc.) of the virtual representation of the inactive user 103. Additionally, the processor 551 may execute the audio capture and emission code 557 to simulate an audio-based interaction with the inactive user 103. For example, the active user 102 may hear certain audio emitted from the virtual representation of the inactive user 103, and may respond via his or her own audio emissions. The processor 551 may coordinate the visual movements of the virtual representation of the inactive user 103 with the audio emissions from the virtual representation of the inactive user 103, as well as the audio emissions from the active user 102. For instance, the processor 551 may instantiate certain facial expressions during audio emission by the virtual representation of the inactive user 103, and other facial expressions, as a reaction, while listening to the audio emissions from the active user 102.

Additionally, the system configuration may have one or more input/output ("I/O") devices 553 that may receive inputs and provide outputs. Various devices (e.g., display device, keyboard, microphone, speakers, mouse, pointing device, hand controller, joystick, display device, holographic projector, etc.) may be used for the I/O devices 553. The system configuration may also have a transceiver 554 to send and receive data. Alternatively, a separate transmitter and receiver may be used instead.

The system configurations illustrated in FIGS. 5A and 5B are illustrated with respect to the computing device 115 for an AR experience, but are not limited to AR-based devices. For example, the componentry of the system configurations illustrated in FIGS. 5A and 5B may be utilized in whole or in part for a VR configuration in conjunction with the computing device 401 illustrated in FIGS. 4A and 4B.

Figure 6:
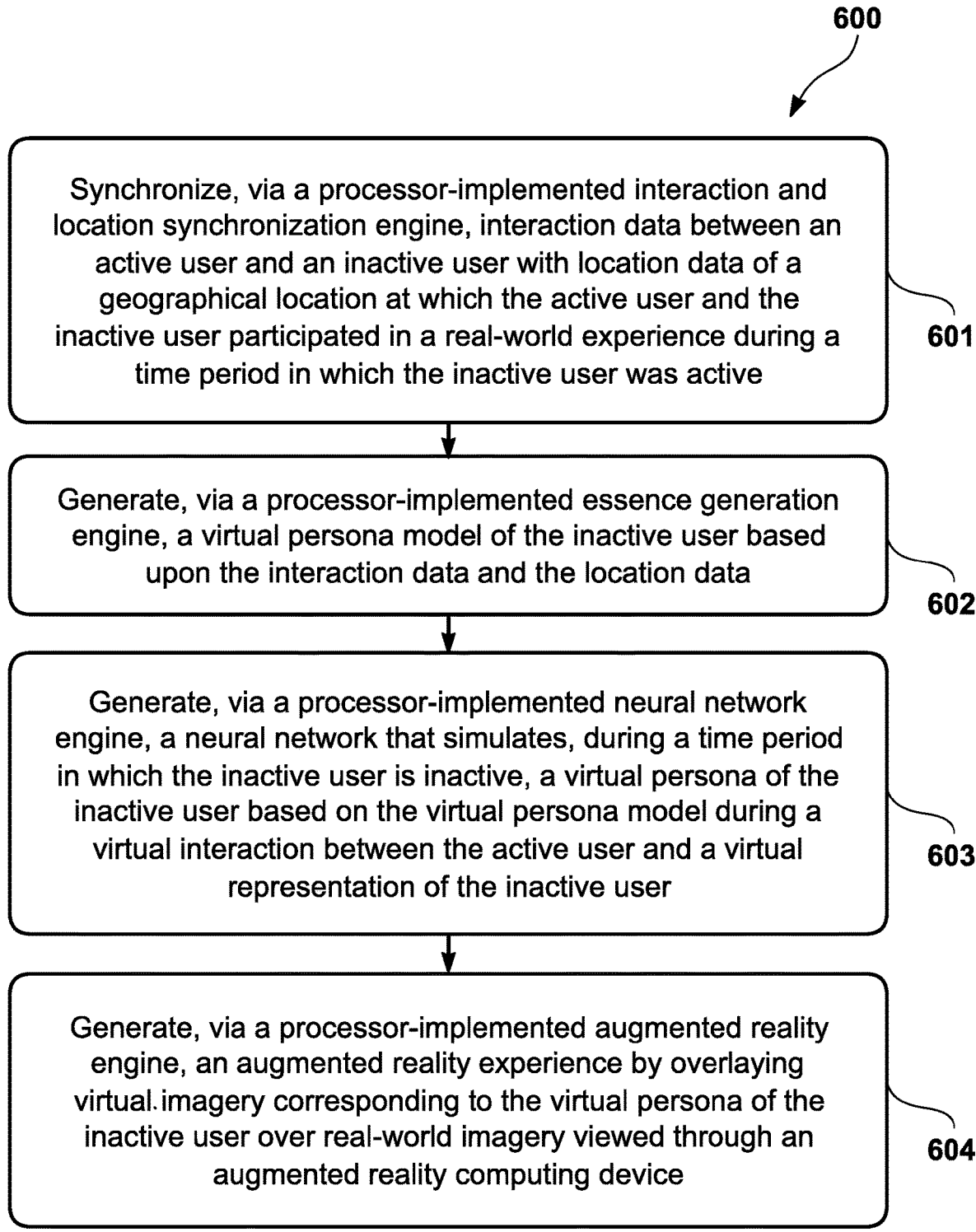
FIG. 6 illustrates a process that may be utilized by the essence generation platform to generate an AR experience based on interaction and/or location data.

FIG. 6 illustrates a process 600 that may be utilized by the essence generation platform 101 to generate an AR experience based on interaction and/or location data. At a process block 601, the process 600 synchronizes, via a processor-implemented interaction and location synchronization engine 106, interaction data between an active user 102 and an inactive user 103 with location data of a geographical location at which the active user 102 and the inactive user 103 participated in a real-world experience during a time period in which the inactive user 103 was active. Furthermore, at a process block 602, the process 600 generates, via a processor-implemented essence generation engine 108, a virtual persona model of the inactive user 103 based upon the interaction data and the location data. In addition, at a process block 603, the process 600 generates, via a processor-implemented neural network engine 112, a neural network that simulates, during a time period in which the inactive user 103 is inactive, a virtual persona of the inactive user 103 based on the virtual persona model during a virtual interaction between the active user 102 and a virtual representation of the inactive user 103. Moreover, at a process block 604, the process generates, via the processor-implemented augmented reality engine 109, an AR experience by overlaying virtual imagery corresponding to the virtual persona of the inactive user 103 over real-world imagery viewed through an AR computing device 115.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. A computer-implemented augmented reality essence generation platform comprising:
   a processor;
   a capture device that captures real-world interaction data at a geographical location, the real-world interaction data including a real-world experience between a first user in an active state and a second user in an active state at a first time period, the real-world interaction data including one or more data types;

an interaction and location synchronization engine that synchronizes the real-world interaction data between the active first user and the active second user at the geographical location during the first time period;

an essence generation engine that generates, via the processor, a virtual persona model of the active second user based upon the collected data from the synchronization engine at a second time period subsequent to the first time period in which the second user is now in an inactive state and generates augmented reality interaction data between the active first user and the inactive second user with location data corresponding to the geographical location that was captured from the capture device;

a neural network engine that generates, via the processor, a neural network that simulates, during the second time period, a virtual persona of the second inactive user based on the virtual persona model during a virtual interaction between the active first user and a virtual representation of the inactive second user; and an augmented reality engine that generates, via the processor, an augmented reality experience by overlaying virtual imagery corresponding to the simulated virtual persona of the second inactive user over real-world imagery viewed through an augmented reality computing device of the first active user at the geographical location during the second time period.

2. A computer program product comprising a non-transitory computer useable storage device having a computer readable program, wherein the computer readable program when executed on a server computer causes the server computer to:

capture real-world interaction data at a geographical location, the real-world interaction data including a real-world experience between a first user in an active state and a second user in an active state at a first time period, the real-world interaction data including one or more data types;

synchronize the real-world interaction data between the active first user and the active second user at the geographical location during the first time period;

generate, at a second time period subsequent to the first time period, a virtual persona model of the active second user based upon the collected data from the synchronizing in which the second user is now in an inactive state and generates augmented reality interaction data between the active first user and the inactive second user with location data corresponding to the geographical location that was captured from the capture device;

generate a neural network that simulates, during the second time period, a virtual persona of the second inactive user based on the virtual persona model during a virtual interaction between the active first user and a virtual representation of the inactive second user;

generate an augmented reality experience by overlaying virtual imagery corresponding to the simulated virtual persona of the second inactive user over real-world imagery viewed through an augmented reality computing device of the first active user at the geographical location during the second time period.

3. The computer-implemented augmented reality essence generation platform of claim 1, wherein the second time period corresponds to a time period in which the inactive second user is physically incapacitated.

4. The computer-implemented augmented reality essence generation platform of claim 1, wherein the second time period in which the inactive second user is inactive corresponds to a time period in which the inactive second user is deceased.

5. The computer-implemented augmented reality essence generation platform of claim 1, wherein the interaction and location synchronization engine performs the synchronization based on one or more interaction timestamps and one or more location timestamps.

6. The computer-implemented augmented reality essence generation platform of claim 1, wherein the capture device automatically receives the real-world interaction data from a first computing device operated by the active first user and a second computing device operated by the inactive second user during the first time period.

7. The computer-implemented augmented reality essence generation platform of claim 1, wherein the real-world interaction data is image data captured by a computing device operated by the active first user during the real-world experience.

8. The computer-implemented augmented reality essence generation platform of claim 1, wherein the real-world interaction data is image data captured by a computing device operated by the inactive second user during the real-world experience.

9. The computer-implemented augmented reality essence generation platform of claim 1, wherein the real-world interaction data is voice data captured by a computing device operated by the active first user during the real-world experience, the voice data being associated with the active first user and the inactive second user.

10. The computer-implemented augmented reality essence generation platform of claim 1, wherein the real-world interaction data is voice data captured by a computing device operated by the inactive second user during the real-world experience, the voice data being associated with the active first user and the inactive second user.

11. The computer program product of claim 2, wherein the second time period corresponds to a time period in which the inactive second user is physically incapacitated.

12. The computer program product of claim 2, wherein the second time period corresponds to a time period in which the inactive second user is deceased.

13. The computer program product of claim 2, wherein the server computer is further caused to perform the synchronization based on one or more interaction timestamps and one or more location timestamps.

14. The computer program product of claim 2, wherein the server computer is further caused to automatically receive the real-world interaction data from a first computing device operated by the active first user and a second computing device operated by the inactive second user during the first time period in which the inactive second user was active.

15. The computer program product of claim 2, wherein the real-world interaction data is image data captured by a computing device operated by the active first user during the real-world experience.

16. The computer program product of claim 2, wherein the real-world interaction data is image data captured by a computing device operated by the inactive second user during the real-world experience.

17. The computer program product of claim 2, wherein the real-world interaction data is voice data captured by a computing device operated by the active first user during the real-world experience, the voice data being associated with the active first user and the inactive second user.

18. The computer program product of claim 2, wherein the real-world interaction data is voice data captured by a computing device operated by the inactive second user during the real-world experience, the voice data being associated with the active first user and the inactive second user.

19. The computer-implemented augmented reality essence generation platform of claim 1, wherein the one or more data types are selected from the group consisting of: email, image, video, text message, and chat.

20. The computer program product of claim 2, wherein the one or more data types are selected from the group consisting of: email, image, video, text message, and chat.

* * * * *